United States Patent
Nam et al.

(10) Patent No.: US 8,400,363 B2
(45) Date of Patent: Mar. 19, 2013

(54) IN-MOLD TYPE RF ANTENNA, DEVICE INCLUDING THE SAME, AND ASSOCIATED METHODS

(75) Inventors: Kwang Hyun Nam, Uiwang-si (KR); Jae Hwan Kim, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 456 days.

(21) Appl. No.: 12/654,875

(22) Filed: Jan. 7, 2010

(65) Prior Publication Data

US 2010/0201582 A1 Aug. 12, 2010

(30) Foreign Application Priority Data

Feb. 10, 2009 (KR) .................. 10-2009-0010642

(51) Int. Cl.
*H01Q 1/24* (2006.01)
*H01P 11/00* (2006.01)

(52) U.S. Cl. .......................... 343/702; 29/600
(58) Field of Classification Search .................. 343/702, 343/700 MS, 873; 29/600, 601; 257/679, 257/728

See application file for complete search history.

(56) References Cited

U.S. PATENT DOCUMENTS

| | | | |
|---|---|---|---|
| 6,962,613 B2 * | 11/2005 | Jenson | 29/623.5 |
| 7,194,801 B2 * | 3/2007 | Jenson et al. | 29/730 |
| 7,196,668 B2 * | 3/2007 | Lin et al. | 343/702 |
| 7,367,114 B2 * | 5/2008 | Rybka et al. | 29/623 |
| 7,463,199 B2 * | 12/2008 | Soler Castany et al. | 343/700 MS |
| 7,541,986 B2 * | 6/2009 | Park | 343/702 |
| 2003/0197648 A1 | 10/2003 | Quinn et al. | |
| 2007/0238492 A1 | 10/2007 | Kaneko et al. | |
| 2008/0036680 A1 | 2/2008 | Ito et al. | |
| 2008/0150813 A1 | 6/2008 | Yung-Sen | |

FOREIGN PATENT DOCUMENTS

| | | |
|---|---|---|
| DE | 10 2007-049284 A1 | 4/2009 |
| EP | 0410708 A2 | 1/1991 |
| EP | 0543664 A2 | 5/1993 |
| EP | 2 086 049 A1 | 8/2009 |
| KR | 10-2005-0108472 A | 11/2005 |
| KR | 10-2007-0084093 A | 8/2007 |
| KR | 10-2007-0118328 A | 12/2007 |
| WO | WO 99-22420 | 5/1999 |
| WO | WO 2006-043543 A1 | 4/2006 |
| WO | WO 2008-044845 A1 | 4/2008 |

OTHER PUBLICATIONS

Office Action issued in corresponding European application, 10 153 183.8, dated Jun. 9, 2011.
Office Action issued in corresponding Korean application, 10-2009-0010642, dated Jun. 14, 2011.

* cited by examiner

*Primary Examiner* — Huedung Mancuso
(74) *Attorney, Agent, or Firm* — Lee & Morse, P.C.

(57) ABSTRACT

An in-mold type RF antenna, a device including the same, and associated methods, a method including stacking a copper foil on a base film, forming an antenna film by processing the copper foil to form an RF antenna pattern thereon, the antenna film being configured to be accommodated in a case of a device, disposing the antenna film in a mold for forming the case of the device, and forming the case having the antenna film integrally formed therewith by injecting a resin into the mold.

14 Claims, 4 Drawing Sheets

IN-MOLD TYPE RF ANTENNA, DEVICE INCLUDING THE SAME, AND ASSOCIATED METHODS

BACKGROUND

1. Field

Embodiments relate to an in-mold type RF antenna, a device including the same, and associated methods.

2. Description of the Related Art

Portable devices, e.g., mobile phones, portable multimedia players (PMPs), portable digital multimedia broadcastings (DMBs), and the like, may include a display window, a battery, and at least one antenna. To perform various functions, the portable devices may include an RF antenna for recognition of radio-frequency identification (RFID) tags in addition to an antenna for transmission and reception of radio waves.

The RF antenna may require a predetermined installation area due to size and shape requirements thereof. The RF antenna may be formed separately from a main printed circuit board and may then be attached to the main printed circuit board. The separate RF antenna may be attached to an outer case or may be integrated with a surface of a battery.

As batteries for portable device are made thinner, interference with RFID tags may occur due to current in the battery. In addition, if the RF antenna is integrally formed with a consumable battery, an RF antenna must be integrated with all batteries for use with the portable devices. Accordingly, manufacturing costs may be increased.

SUMMARY

Embodiments are directed to an in-mold type RF antenna, a device including the same, and associated methods, which represent advances over the related art.

It is a feature of an embodiment to provide an in-mold type RF antenna with improved assembly efficiency, reduced manufacturing costs, and stable communication.

At least one of the above and other features and advantages may be realized by providing a method of manufacturing an in-mold type RF antenna including stacking a copper foil on a base film, forming an antenna film by processing the copper foil to form an RF antenna pattern thereon, the antenna film being configured to be accommodated in a case of a device, disposing the antenna film in a mold for forming the case of the device, and forming the case having the antenna film integrally formed therewith by injecting a resin into the mold.

Disposing the antenna film in the mold may include disposing the antenna film in a position corresponding to a bezel surrounding a periphery of a display window of the device.

Disposing the antenna film in the mold may include disposing the antenna film in a position corresponding to a separable battery cover of the device.

Disposing the antenna film may include disposing the antenna film in the mold such that the antenna film is integrated with an inner surface of the case.

The method may further include connecting the antenna film to an internal printed circuit board using an anisotropic conductive film (ACF).

The base film may include at least one of a polyimide film, a polyethylene terephthalate film, a polyphenylene sulfide film, a polyethylene naphthalate film, a polyamide film, a polycarbonate film, and a poly(methyl methacrylate) film.

The method may further include forming an adhesive layer on a surface of the antenna film contacting the resin.

Forming the adhesive layer on the surface may occur prior to disposing the antenna film in the mold.

Forming the adhesive layer on the surface may occur after disposing the antenna film in the mold.

Forming the adhesive layer may include applying a high temperature resistant thermosetting adhesive to the surface of the antenna film by one of roll coating, screen coating, or spray coating.

The adhesive may include at least one of a polyester-based adhesive, an epoxy-based adhesive, and a phenoxy-based adhesive.

Processing the copper foil may include etching the copper foil.

At least one of the above and other features and advantages may also be realized by providing an in-mold type RF antenna manufactured by the method of an embodiment.

At least one of the above and other features and advantages may also be realized by providing a device including the in-mold type RF antenna of an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
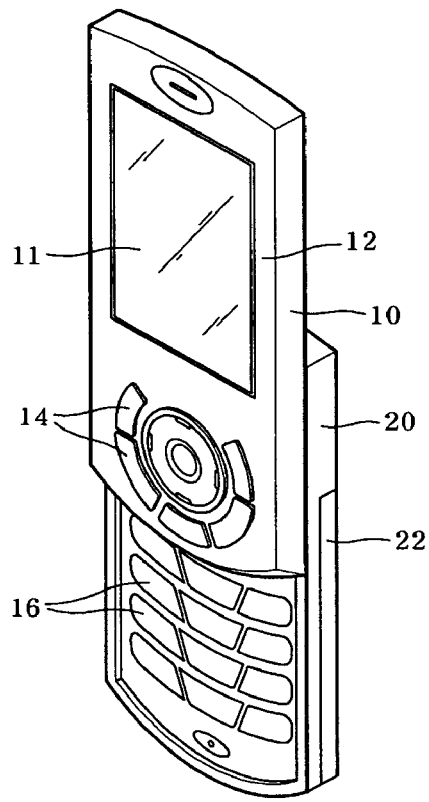
FIG. 1 illustrates a front perspective view of a mobile phone.

Korean Patent Application No. 10-2009-0010642, filed on Feb. 10, 2009, in the Korean Intellectual Property Office, and entitled: "In-Mold Type RF Antenna and Method of Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a front perspective view of a mobile phone. Referring to FIG. 1, the mobile phone may include a front case 10 and a rear case 20. The front case 10 may include a display window 11 occupying a wide area of the front case 10 and keypads 14 and 16 arranged in a remaining area thereof. The front case 10 may include a bezel 12 around a periphery of the display window 11. The rear case 20 may include a battery cover 22.

Figure 2:
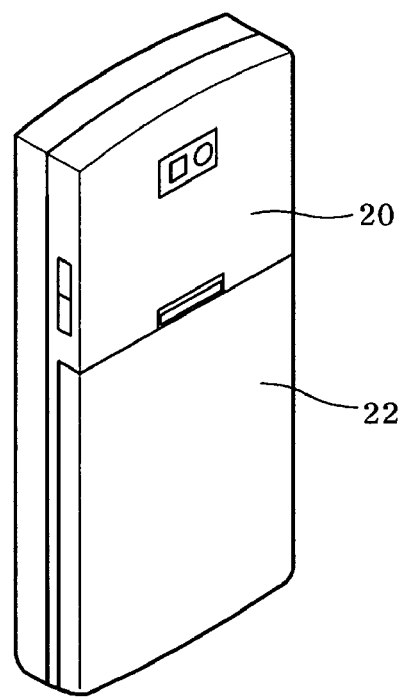
FIG. 2 illustrates a rear perspective view of the mobile phone.

FIG. 2 illustrates a rear perspective view of the mobile phone. Referring to FIG. 2, the mobile phone may include the rear case 20 and the battery cover 22 separable from the rear case 20 at a rear side thereof. The battery cover 22 may be separated from a battery cell (not illustrated) and may be detachably mounted to the rear case 20.

A method of an embodiment may include integrating the RF antenna with the case of a device, e.g., a mobile phone. The method may include disposing an RF antenna film in an injection mold for the case and then injecting a resin into the mold to form the case.

When forming the RF antenna in the front case 10 of the mobile phone, the RF antenna may be integrally formed with the bezel 12 corresponding to the periphery of the display window 11. Another embodiment provides a method of integrally forming the RF antenna in the battery cover 22 to dispose the RF antenna in the rear case 20.

Figure 3:
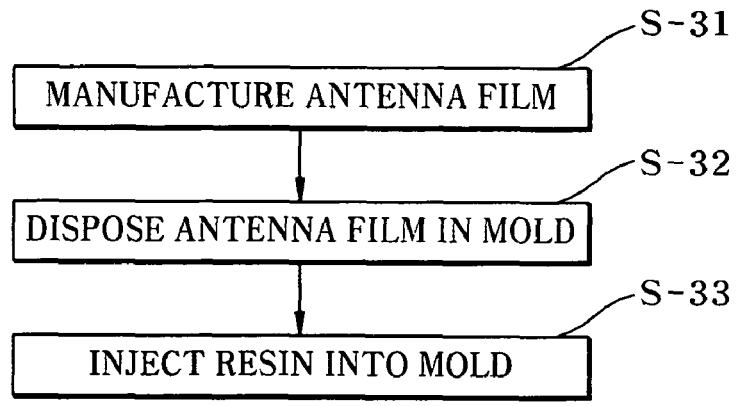
FIG. 3 illustrates a flowchart of a method of manufacturing an in-mold type RF antenna according to an embodiment.

FIG. 3 illustrates a flowchart of a manufacturing method for an in-mold type RF antenna according to an embodiment. Referring to FIG. 3, the method may include manufacturing an antenna film in S-31. Then, the manufactured antenna film may be disposed in a case mold in S-32. Finally, a case of a device may be formed by injecting a resin into the mold with the antenna film disposed therein in S-33.

In order to manufacture the antenna film, a copper foil may be stacked on a base film. An RF antenna pattern may be formed by processing, e.g., etching, the stacked copper foil.

The base film may include, e.g., a polyimide film, a polyethylene terephthalate film, a polyphenylene sulfide film, a polyethylene naphthalate film, a polyamide film, a polycarbonate film, and/or a poly(methyl methacrylate) film.

The antenna film may have a shape corresponding to a shape of the device. When the antenna film is integrally formed with the bezel 12, i.e. around the periphery of the display window 11, the antenna film may have a frame shape.

On the other hand, when the antenna film is integrally formed with the battery cover 22, the antenna film may have a shape corresponding to a shape of the battery cover 22 and may be smaller than the battery cover. In an implementation, the battery cover 22 may be a separate cover that may be separable from a battery cell.

After the antenna film is formed to correspond to the shape of the portion of the device case with which it will be integrated, the antenna film may be disposed in the mold for the case of the device. In an implementation, the antenna film may be disposed in a portion of the mold for forming, i.e., defining, an inner surface of the case.

With the antenna film disposed in the mold, the case, e.g., the front case 10 or battery cover 22, of the device may be injection-molded by injecting a resin into the mold. As a result, the antenna film may be integrally formed with the case, e.g., the front case 10 or the battery cover 22.

To firmly attach the antenna film to the case of the device, an adhesive layer may be formed on a surface of the antenna film that contacts the resin. The adhesive layer may be disposed at an interface between the antenna film and the case resin to reinforce an attaching force between the antenna film and the resin. The adhesive used to reinforce the bonding force between the antenna film and the resin may include, e.g., a high temperature resistant polyester-based adhesive and/or an epoxy or phenoxy-based thermosetting adhesive. The adhesive may be applied to the antenna film by, e.g., roll coating, screen coating, or spray coating. The adhesive may be applied after processing the antenna film and prior to cutting the antenna film to shape or after the antenna film is disposed in the mold.

Figure 4:
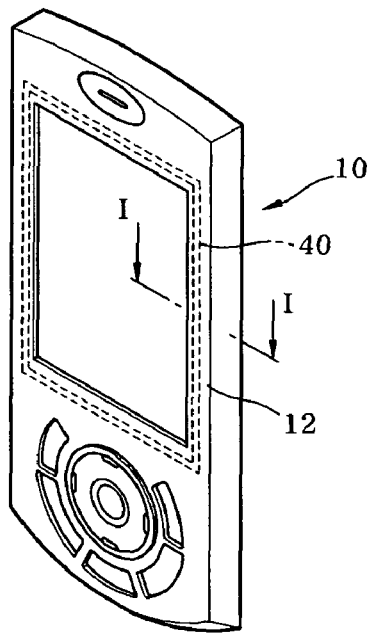
FIG. 4 illustrates a perspective view of a front case having an in-mold type RF antenna integrally formed therewith according to an embodiment.
Figure 5:
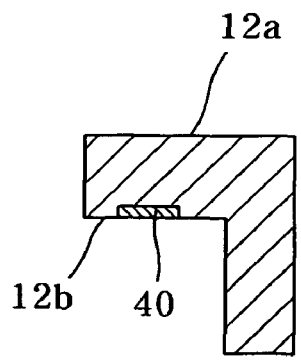
FIG. 5 illustrates a cross-sectional view taken along line I-I of FIG. 4.

FIG. 4 illustrates a perspective view of a front case having an in-mold type RF antenna integrally formed therewith according to an embodiment. FIG. 5 illustrates a cross-sectional view taken along line I-I of FIG. 4.

Referring to FIG. 4, an antenna film 40 having an RF antenna may be integrally formed with the bezel 12 of the front case 10. The front case 10 may have a rectangular frame shape corresponding to the bezel 12 on the antenna film 40.

Referring to FIG. 5, the bezel 12 of the front case 10 may have an outer surface 12a exposed to the outside of the device and an inner surface 12b facing an interior of the device. In an implementation, the antenna film 40 may be integrally formed with the bezel 12 on the inner surface 12b of the bezel 12.

If the antenna film 40 is formed on the outer surface 12a of the bezel 12, the device may not provide an aesthetically pleasing appearance. Thus, the antenna film 40 may be formed on the inner surface 12b to ensure an aesthetically pleasing appearance of the device while also facilitating connection of the antenna film 40 to a printed circuit board.

Figure 6:
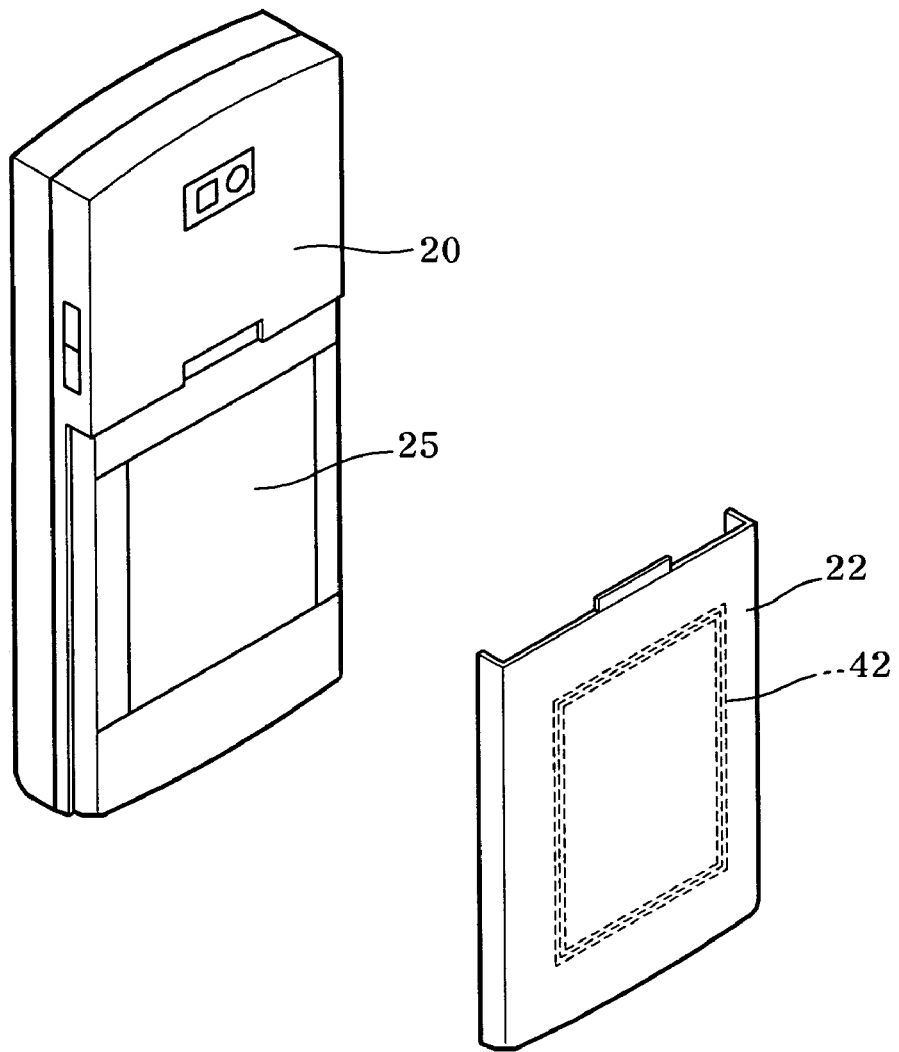
FIG. 6 illustrates a perspective view of a separable battery cover having an in-mold RF antenna integrally formed therewith according to an embodiment.

FIG. 6 illustrates a perspective view of a separable battery cover having an in-mold RF antenna integrally formed therewith according to another embodiment. Referring to FIG. 6, a RF antenna may be integrally formed with the battery cover 22 of a mobile phone, which may have a battery cell 25 separately formed from the battery cover 22.

In the present embodiment, an antenna film 42 having a RF antenna may be integrally formed with an inner surface of the battery cover 22. The battery cover 22 may remain with the mobile phone and still be used even when the battery cell 25 is replaced with new one.

A single mobile phone set may include two battery cells (not illustrated). Therefore, if the battery cells 25 and the battery cover 22 are integrally formed with each other and RF antennae are interposed between the battery cells 25 and the battery cover 22, a number of RF antennae corresponding to the number of battery cells 25 may be required. However, as in the present embodiment, if the battery cells 25 are separated from the battery cover 22 and the RF antenna is integrally formed with the battery cover 22, a single RF antenna may be sufficient for the mobile phone, thereby reducing manufacturing costs and thus saving resources.

Figure 7:
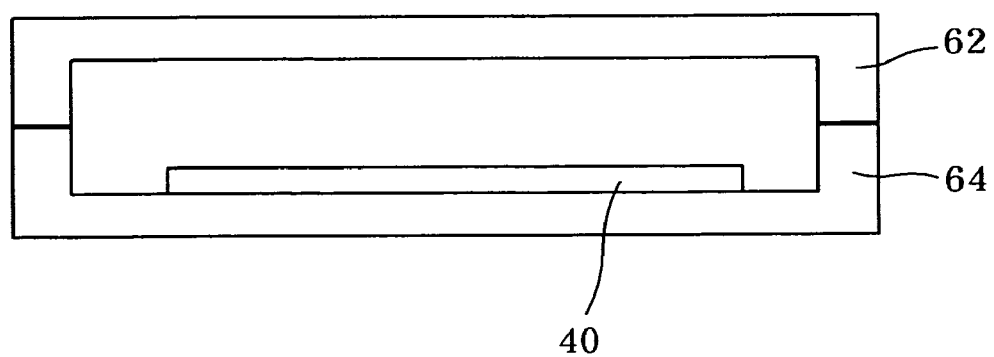
FIG. 7 illustrates a sectional view of a mold for a case, in which an antenna film is disposed according to an embodiment.
Figure 8:
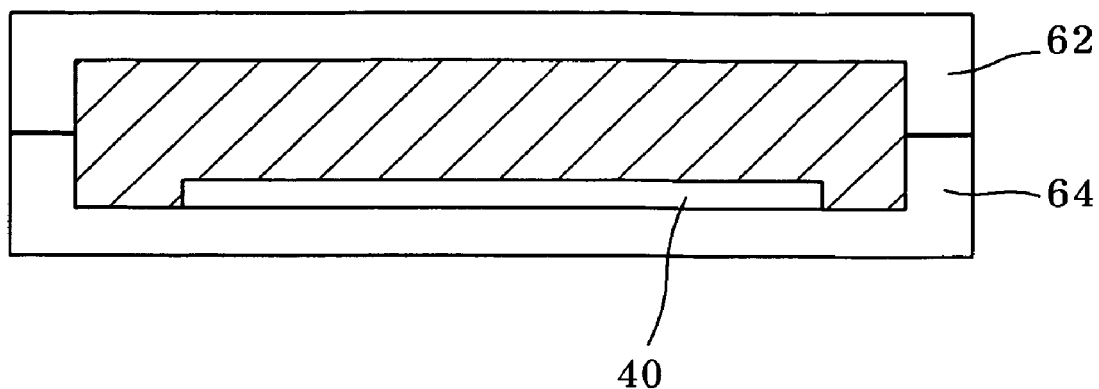
FIG. 8 illustrates a sectional view of the mold of FIG. 7 with the antenna film disposed therein and into which a resin is injected.

FIG. 7 illustrates a sectional view of a mold for a case, in which an antenna film is disposed. FIG. 8 illustrates a sectional view of the mold with the antenna film disposed therein and into which a resin is injected.

Referring to FIG. 7, an antenna film 40 having an RF antenna pattern may be disposed in a mold for a case. The antenna film 40 may be formed by stacking a copper foil on a base film and processing, e.g., etching, the stacked copper foil. The mold may include and upper mold 62 and a lower mold 64. The upper mold 62 may define an outer surface of a resultant case and the lower mold 64 may define an inner surface of the resultant case. The antenna film 40 may be disposed not on the upper mold 62 but rather on the lower mold 64. Accordingly, the antenna film 40 may be integrally formed with the inner surface of the resultant case.

Next, as illustrated in FIG. 8, when injected into the upper and lower molds 62 and 64, a resin may form the case corresponding to the shape of the mold. In addition, the antenna film 40 may be integrally formed with the inner surface of the case.

After the RF antenna is integrally formed with the case, the RF antenna may be connected to an internal printed circuit board by, e.g., a separate soldering process or via an anisotropic conductive film (ACF). Since current may flow through the ACF only in a direction in which pressure is applied, electrical connection between portions may be obtained only by attachment of the ACF to the portions, thereby simplifying assembly.

EXAMPLES

Example 1

A copper foil having a thickness of 36 μm was bonded to a polyimide film (hereinafter, PI film) having a thickness of 50 μm to form a single-surface flexible copper foil plate. Then, an antenna film was prepared by etching an RF antenna circuit in the single-surface flexible copper foil plate. An adhesive was coated on a rear surface of the etched flexible copper foil plate to reinforce a bonding force during injection molding. An RF antenna integrated case was then formed by arranging the antenna film at a predetermined position in a mold and injecting a resin into the mold.

Example 2

An antenna film was formed using the same method as in Example 1 except that a polyethylene terephthalate film (hereinafter, PET film) was used instead of using the PI film. Then, an RF antenna integrated case was formed by arranging the antenna film at a predetermined position in a mold and injecting a resin into the mold as in Example 1.

Comparative Example 1

An antenna film was formed by printing a paste consisting of 75 wt % of Ag (manufactured by DOWA) as a conductive filler, 10 wt % of bisphenol-A type epoxy resin (manufactured by Kukdo Chemical Co., Ltd) as a binder resin, 1 wt % of phthalic anhydride (manufactured by Kukdo Chemical Co., Ltd) as a curing agent, 0.5 wt % of Disper BYK (manufactured by BYK) as a dispersant and residual terpineol as a solvent having a thickness of 30 μm on a PI film having a thickness of 50 μm instead of the single-surface flexible copper foil plate of Example 1. Then, an RF antenna integrated case was formed by arranging the antenna film at a predetermined position in a mold and injecting a resin into the mold as in Example 1.

Comparative Example 2

An antenna film was formed by printing a silver (Ag) ink having a thickness of 30 μm on a PI film having a thickness of 50 μm instead of the single-surface flexible copper foil plate of Example 1. Then, an RF antenna integrated case was formed by arranging the antenna film at a predetermined position in a mold and injecting a resin into the mold as in Example 1.

The materials for the base films and circuit patterns of the Examples and Comparative Examples are shown in Table 1.

TABLE 1

| Classification | Example 1 | Example 2 | Comparative Example 1 | Comparative Example 2 |
| --- | --- | --- | --- | --- |
| Material of base film | PI film | PET film | PI film | PET film |
| Material of circuit pattern | Copper foil | Copper foil | Paste | Ag ink |

Circuit resistances, deformation after injection molding, and antenna recognition distances of the RF antenna integrated cases manufactured as described above were measured. The results are shown in Table 2.

TABLE 2

| Classification | Example 1 | Example 2 | Comparative Example 1 | Comparative Example 2 |
| --- | --- | --- | --- | --- |
| Circuit resistance (Ω) | 0.36 | 0.42 | 1.16 | 2.05 |
| Deformation after injection molding | None | None | None | None |
| Antenna recognition distance | 35 mm | 32 mm | 5 mm | Not recognized |

According to the results, no deformation after injection molding was observed in any of Examples 1 and 2 and Comparative Examples 1 and 2. Examples 1 and 2 exhibited low circuit resistances of 0.36Ω and 0.42Ω, respectively. Examples 1 and 2 also exhibited good antenna recognition distances of 35 mm and 32 mm, respectively.

In contrast, Comparative Example 1 exhibited such high circuit resistances that the antenna recognition distance was only 5 mm. Further, the antenna of Comparative Example 2 could not be recognized at all.

As apparent from the above description, the method according to an embodiment may enhance assembly efficiency and may reduce manufacturing costs by integrally forming a RF antenna with a bezel of a display window or a separable battery cover of a case of a device.

Further, according to an embodiment, an RF antenna may be integrally formed with a case, thereby reducing interference between internal parts and enabling stable communications.

In addition, according to an embodiment, an RF antenna may exhibit superior circuit resistance and antenna recognition distance.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A method of manufacturing an in-mold type RF antenna, comprising:
   stacking a copper foil on a base film;
   forming an antenna film by processing the copper foil to form an RF antenna pattern thereon, the antenna film being configured to be accommodated in a case of a device;
   disposing the antenna film in a mold for forming the case of the device; and forming the case having the antenna film integrally formed therewith by injecting a resin into the mold after forming an adhesive layer on a surface of the antenna film to be contacted by the resin.

2. The method as claimed in claim 1, wherein disposing the antenna film in the mold includes disposing the antenna film in a position corresponding to a bezel surrounding a periphery of a display window of the device.

3. The method as claimed in claim 1, wherein disposing the antenna film in the mold includes disposing the antenna film in a position corresponding to a separable battery cover of the device.

4. The method as claimed in claim 1, wherein disposing the antenna film includes disposing the antenna film in the mold such that the antenna film is integrated with an inner surface of the case.

5. The method as claimed in claim 1, further comprising: connecting the antenna film to an internal printed circuit board using an anisotropic conductive film (ACF).

6. The method as claimed in claim 1, wherein the base film includes at least one of a polyimide film, a polyethylene terephthalate film, a polyphenylene sulfide film, a polyethylene naphthalate film, a polyamide film, a polycarbonate film, and a poly(methyl methacrylate) film.

7. The method as claimed in claim 1, wherein forming the adhesive layer on the surface occurs prior to disposing the antenna film in the mold.

8. The method as claimed in claim 1, wherein forming the adhesive layer on the surface occurs after disposing the antenna film in the mold.

9. The method as claimed in claim 1, wherein forming the adhesive layer includes applying a high temperature resistant thermosetting adhesive to the surface of the antenna film.

10. The method as claimed in claim 9, wherein the adhesive includes at least one of a polyester-based adhesive, an epoxy-based adhesive, and a phenoxy-based adhesive.

11. The method as claimed in claim 1, wherein processing the copper foil includes etching the copper foil.

12. An in-mold type RF antenna manufactured by the method as claimed in claim 1.

13. A device including the in-mold type RF antenna of claim 12.

14. The method as claimed in claim 2, wherein the antenna film is disposed in a position only corresponding to the bezel and surrounding a periphery of a display window of the device.

* * * * *